United States Patent [19]

Cords et al.

[11] Patent Number: 5,368,372
[45] Date of Patent: Nov. 29, 1994

[54] HYDRAULIC BRAKE SYSTEM FOR AN OFF-ROAD VEHICLE

[75] Inventors: Frederick W. Cords, Good Thunder; David Frye, North Mankato, both of Minn.

[73] Assignee: Total Quality Enterprises, Inc., Mankato, Minn.

[21] Appl. No.: 29,142
[22] Filed: Mar. 10, 1993

Related U.S. Application Data

[63] Continuation-in-part of Ser. No. 969,877, Oct. 20, 1992.
[51] Int. Cl.⁵ .................. B60T 7/14; B60T 13/18; B60T 13/20
[52] U.S. Cl. ....................... 303/11; 303/20; 188/109
[58] Field of Search ............ 188/109; 137/115, 901; 303/10, 11, 20, 122.8; 180/272, 273

[56] References Cited

U.S. PATENT DOCUMENTS

| | | | |
|---|---|---|---|
| Re. 30,550 | 3/1981 | Reise | 188/112 A |
| 772,654 | 10/1904 | Fraser | 188/109 |
| 3,332,522 | 7/1967 | Dence | 188/109 |
| 3,342,292 | 9/1967 | Wherry | 188/112 A |
| 3,360,305 | 12/1967 | Ryskamp | 188/109 X |
| 3,682,278 | 8/1972 | Wherry | 188/112A |
| 3,788,431 | 1/1974 | York | 188/109 |
| 3,796,287 | 3/1974 | Kolm | 188/112 A |
| 3,881,577 | 5/1975 | Wherry et al. | 188/112 A |
| 3,951,464 | 4/1976 | Donahue et al. | 303/7 |
| 3,989,270 | 11/1976 | Henderson | 280/478 A |
| 3,995,911 | 12/1976 | Kasselmann et al. | 303/2 |
| 4,196,936 | 8/1980 | Snyder | 303/20 |
| 4,223,766 | 9/1980 | Huetsch et al. | 188/112 R |
| 4,239,252 | 12/1980 | Huetsch et al. | 280/446 R |
| 4,243,271 | 1/1981 | Dwyer | 303/7 |
| 4,249,643 | 2/1981 | Yoder | 188/112 R |
| 4,343,517 | 8/1982 | Levington | 303/7 |
| 4,402,553 | 9/1983 | Hipps | 303/3 |
| 4,453,620 | 6/1984 | Angus et al. | 188/112 R |
| 4,600,089 | 7/1986 | Wilson | 188/112 R |
| 4,635,758 | 1/1987 | Beard, Jr. | 188/3 H |
| 4,671,578 | 6/1987 | Rothen et al. | 303/15 |
| 4,735,463 | 4/1988 | Rhoton et al. | 303/16 |
| 4,787,487 | 11/1988 | Conradi | 188/328 |
| 4,840,256 | 6/1989 | Webb | 188/112 R |
| 4,842,340 | 6/1989 | Kullmann et al. | 303/7 |
| 4,899,642 | 2/1990 | Hwang | 91/510 |
| 4,993,738 | 2/1991 | Bennett | 280/432 |
| 5,036,956 | 8/1991 | Genier | 188/59 |
| 5,040,816 | 8/1991 | Goettker | 280/446.1 |
| 5,051,053 | 9/1991 | Groeneweg | 414/483 |

FOREIGN PATENT DOCUMENTS

| | | | |
|---|---|---|---|
| 1519618 | 2/1968 | France | 188/109 |
| 2548856 | 5/1977 | Germany | 188/109 |

OTHER PUBLICATIONS

Hydro-Act Model TA-6 Hydraulic Trailer Brak Actuators, Toledo Stamping & Manufacturing Co. (2 pages) Jun. 5, 1992.
Hydro Braking—Act "TB" Series Hydraulic Trailer Brake Actuators, Toledo Stamping & Manufacturing Co. (3 pages) Prior to Mar. 10, 1993.

Primary Examiner—Robert J. Oberleitner
Assistant Examiner—Alfred Muratori
Attorney, Agent, or Firm—Faegre & Benson

[57] ABSTRACT

A brake system for off-road vehicles of the type including an operator seat, a brake pedal and a hydraulic brake responsive to operator actuation on the brake pedal. The brake system includes a tank for hydraulic fluid, an electric pump hydraulically connected to the tank, a pressure modulating valve actuated by the brake pedal and a flow control valve for controlling the flow of pressurized hydraulic fluid between the pump, pressure modulating valve and brake. During normal braking operation, a switch responsive to operator actuation of the brake pedal causes to provide pressurized hydraulic fluid to the brake through the flow control valve. The return flow of pressurized fluid to the tank is modulated by the pressure modulating valve in response to operator actuation of the brake pedal to control the braking pressure. The flow control valve is responsive to the presence of an operator in the operator compartment, and is coupled to a switch. In the event an unoccupied seat condition is sensed, the switch actuates the pump, and the flow control valve is switched to a flow path which routes all the pressurized fluid to the brake. The brake is thereby automatically actuated when an unoccupied seat condition is sensed. The pressure modulating valve also includes a secondary fail-safe chamber which is actuated by the brake pedal to supply hydraulic fluid to the brake during a fail-safe mode when the pump is not operating.

34 Claims, 4 Drawing Sheets

HYDRAULIC BRAKE SYSTEM FOR AN OFF-ROAD VEHICLE

REFERENCE TO CO-PENDING APPLICATION

This application is a continuation-in-part of the commonly assigned Cords et al. U.S. patent application Ser. No. 07/969,877, filed Oct. 20, 1992, and entitled CONTROL VALVE FOR HYDRAULIC BRAKING SYSTEM.

BACKGROUND OF THE INVENTION

The present invention relates generally to hydraulic brake systems for vehicles. In particular, the present invention is an off-road vehicle brake system capable of automatically applying braking force when an unoccupied seat condition is sensed, and capable of operating in a fail-safe mode in the event of brake system power loss.

There is a continuing need for improved brake systems for offroad vehicles. These brake systems must be capable of quickly and smoothly stopping the vehicles in response to operator actuation of the brake pedal during normal operating conditions. The brake system should also be capable of automatically applying braking force to the vehicle in the event the operator is for some reason not properly positioned to operate the vehicle. A brake system having these capabilities even if the vehicle loses engine or brake system power would be especially desirable. To be commercially viable, the brake system must also be reliable and capable of being efficiently manufactured and assembled.

SUMMARY OF THE INVENTION

The present invention is an efficient and reliable brake system for vehicles of the type including an operator seat, a brake pedal and a hydraulic brake responsive to operator actuation of the brake pedal. In one embodiment the brake system includes a Lank for hydraulic fluid, an electric pump hydraulically connected between the tank and brake for providing pressurized hydraulic fluid, and a seat condition switch responsive to the presence of an operator in the operator seat. The seat condition switch actuates the electric pump causing pressurized hydraulic fluid to be applied to the brake whenever an unoccupied seat condition is sensed.

In another embodiment the brake system also includes a flow control valve and a pressure modulating valve. The flow control valve includes an input port hydraulically connected to the electric pump, a first output port hydraulically connected to the brake, a second output port, and a plunger responsive to the presence of an operator in the operator seat for switching the valve between first and second flow paths. The first flow path hydraulically couples the input port to both the first and second output ports when an occupied seat condition is sensed. The second flow path hydraulically couples the input port to the first output port and decouples the second output port from the input port when an unoccupied seat condition is sensed. The pressure modulating valve includes an input port hydraulically connected to the second output port of the flow control valve, an output port hydraulically coupled to the tank, a modulating fluid flow path between the input and output ports, and a modulator piston. When the operator actuates the brake pedal during an occupied seat condition, the modulator piston modulates the flow of pressurized fluid through the modulating fluid flow path. The return flow of pressurized hydraulic fluid from the flow control valve to the tank is thereby restricted to actuate the brake.

In yet another embodiment the brake system further includes a reverse flow check valve for preventing the flow of hydraulic fluid from the flow control valve to the pump. The pressure modulating valve in this embodiment includes a primary piston responsive to operator actuation of the brake pedal, a fail-safe fluid chamber between the primary piston and modulator piston, and a fail-safe fluid flow path and reverse flow check valve in the modulator piston between the fail-safe fluid chamber and the modulating fluid flow path. The pressure modulating valve operates in a modulating mode with the fail-safe chamber acting as a pressure lock to enable to the modulator piston to restrict the flow of pressurized fluid to the tank and actuate the brake in response to operator actuation of the brake pedal when the pump is operating. When the brake pedal is actuated while the pump is not operating, the modulating valve operates in a fail-safe mode with the primary piston forcing fluid from the fail-safe chamber through the reverse flow check valve in the modulator piston and out of the modulating valve input port to actuate the brake.

DETAILED DESCRIPTION OF TEE PREFERRED EMBODIMENTS

Figure 1:
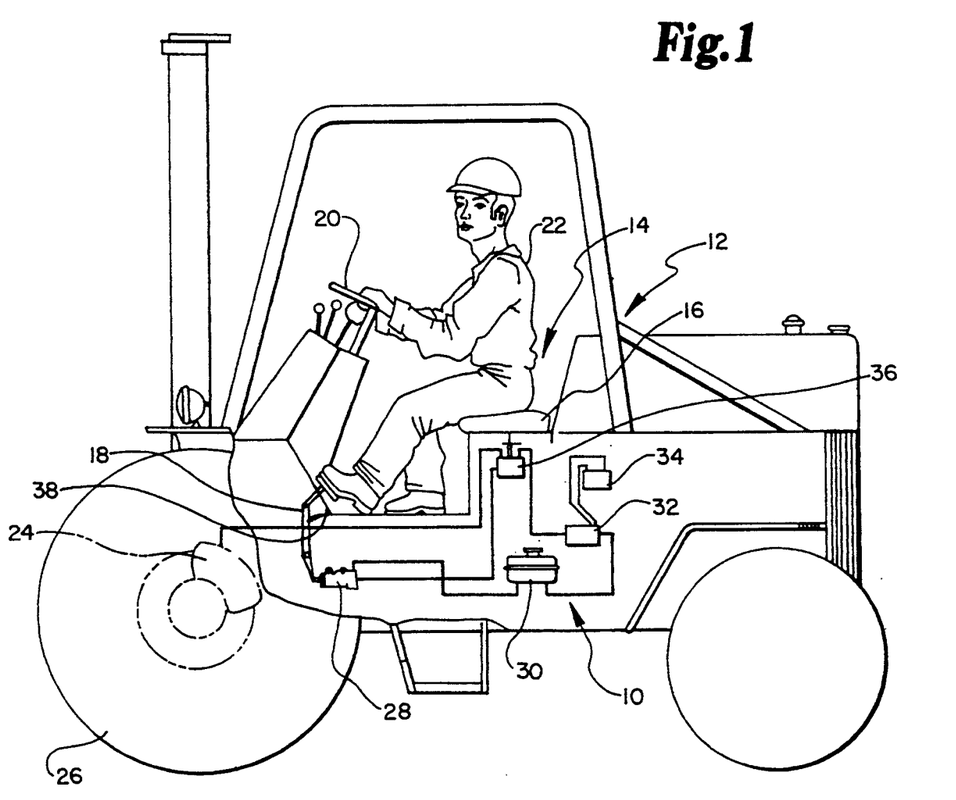
FIG. 1 is an illustration of an off-road vehicle which includes a hydraulic brake system in accordance with the present invention.

An off-road forklift vehicle 12 which includes a hydraulic brake system 10 in accordance with the present invention is illustrated generally in FIG. 1. As shown, vehicle 12 includes an operator compartment 14 with a seat 16, brake pedal 18 and steering mechanism 20 which are used by an operator 22 to control the vehicle. A brake 24 is mounted to the front wheel 26 of vehicle 12 in the embodiment shown. As described below, brake system 10 is capable of operation in "unoccupied seat" and "fail-safe" modes in addition to a normal braking mode.

Hydraulic brake system 10 includes pressure modulating valve 28, hydraulic fluid tank 30, DC (permanent magnet motor) electric pump 32, battery 34, valve/switch assembly 36 and brake switch 38. Brake switch 38 is electrically connected between pump 32 and battery 34. While operator 22 is sitting on seat 16 and actuating brake pedal 18 during normal braking operations, brake switch 38 senses the movement of the brake pedal and turns on or actuates pump 32. When on, pump 32 supplies pressurized hydraulic fluid to brake 24 through valve/switch assembly 36. The return flow of pressurized hydraulic fluid from valve/switch assembly 36 to tank 30 is modulated by pressure modulating valve 28 in response to operator actuation of brake pedal 18, thereby controlling the amount of hydraulic fluid applied to brake 24 and the amount of braking force applied to wheels 26. In the unoccupied seat mode, brake system 10 automatically applies pressurized hydraulic fluid to brake 24 when an unoccupied seat condition is sensed, (e.g., when operator seat 16 is unoccupied or operator 22 is not otherwise properly positioned within the operator compartment 14). The fail-safe mode of operation enables operator 22 to apply pressurized hydraulic fluid to brake 24 even if pump 32 is inoperable when battery 34 does not have sufficient power to drive the pump or the pump has mechanically failed). These features of the invention are described in greater detail below.

Figure 2:
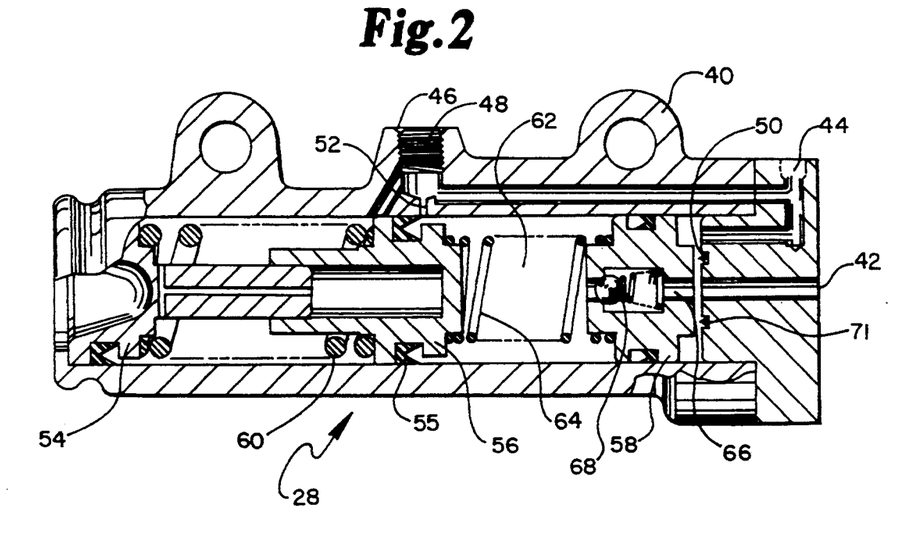
FIG. 2 is a sectional view of the pressure modulating valve shown in FIG. 1 in an unactuated state.
Figure 5:
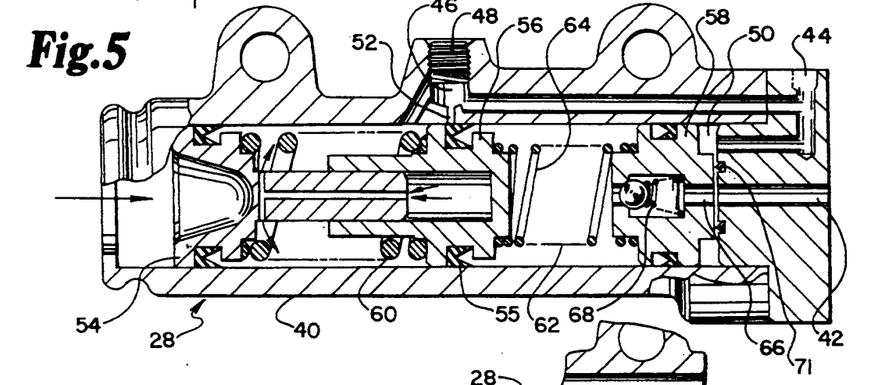
FIG. 5 is a sectional view of the pressure modulating valve shown in FIG. 2, with the primary piston actuated in response to pressure from the brake pedal.

Pressure modulating valve 28 can be described in greater detail with reference to FIGS. 2, 5 and 6. As shown, pressure modulating valve 28 includes a block or housing 40 having an input port 42, an output port 44, and residual port 46 which is sealed by set screw 48 in the embodiment shown. A modulating fluid flow path 50 extends between input port 42 and output port 44 within housing 40. Output port 44 is also coupled to replenishing port 52. Pressure modulating valve 28 includes a primary piston 54, secondary piston 56 and modulating piston 58. Primary piston 54 is coupled to secondary piston 56 by modulator spring 60. Secondary piston 56 and modulator piston 58 are separated by fail-safe chamber 62 and coupled to one another by fail-safe spring 64. A fail-safe fluid flow path 66 extends through modulator piston 58 between fail-safe chamber 62 and modulating fluid flow path 50. Poppet-type reverse flow check valve 68 is positioned within modulator piston 58 to prevent the flow of fluid from modulating fluid flow path 50 into fail-safe chamber 62. Seal 71 surrounds the location at which input port 42 opens into the modulating fluid flow path 50. As shown in FIG. 2, replenishment port 52 is positioned so as to open into fail-safe chamber 62 when pressure modulating valve 28 is not actuated by brake pedal 18. However, upon actuation by brake pedal 18, replenishment port 52 is sealed by seal 55 on secondary piston 56 as shown in FIG. 5.

Valve/switch assembly 36 can be described in greater detail with reference to FIGS. 3 and 4. In the illustrated embodiment, assembly 36 includes a flow control valve 70 and a seat condition switch 72. Flow control valve 70 includes an input port 74, a first output port 76 and a second output port 78. Second output port 78 communicates with first output port 76 and input port 74 at an internal chamber 80. Flow control valve 70 is switched between first and second flow paths by plunger 82. As shown, plunger 82 includes a piston 84 positioned within chamber 80 and a piston linkage arm 86 which extends from flow control valve 70. The fluid flow ports shown on flow control valve 70 in FIG. 3 that are not used for brake system 10 are sealed for this application.

Figure 3:
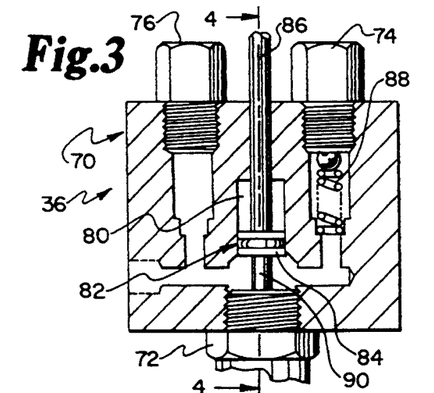
FIG. 3 is a sectional view of the valve/switch assembly shown in FIG. 1, with the valve plunger in the position it takes when an unoccupied seat condition is sensed.
Figure 4:
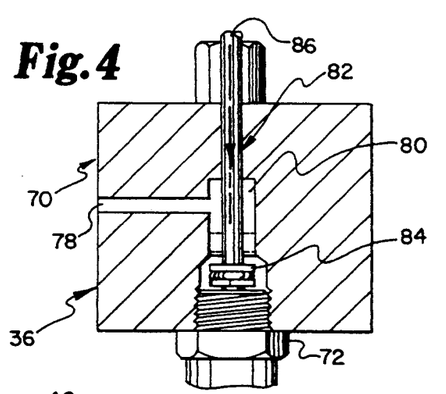
FIG. 4 is a sectional view of the valve/switch assembly taken along line 4-4 in FIG. 3, and illustrating the valve plunger in the position it will take when an occupied seat condition is sensed.

Chamber 80 and plunger piston 84 are configured in such a manner that when the plunger is forced downwardly as shown in FIG. 4, valve 36 is switched to a first flow path condition. In this first flow path condition input port 74 is in fluid communication with both first output port 76 and second output port 78. When plunger 82 is in its upwardly position as shown in FIG. 3, piston 84 fluidly isolates second output port 78 from input port 74. When switched to the second flow path input port 74 remains in fluid communication with first output port 76 as shown in FIG. 3. A poppet-type reverse flow check valve 88 is positioned within valve 70 between chamber 80 and input port 74 to prevent the reverse flow of fluid from the valve out input port 74. Although not shown in FIGS. 3 or 4, valve 70 includes a spring for biasing plunger 82 upwardly in such a manner that without the application of force on arm 86, the valve will be switched to the second flow path.

In the embodiment shown in FIGS. 3 and 4 seat condition switch 72 is threadedly mounted to valve 70. Switch 72 is actuated by mechanical linkage arm 90 engaged by plunger 82. A spring (not shown) biases switch 72 to a normally open electrical state when valve 70 is switched to the first flow path.

Figure 8:
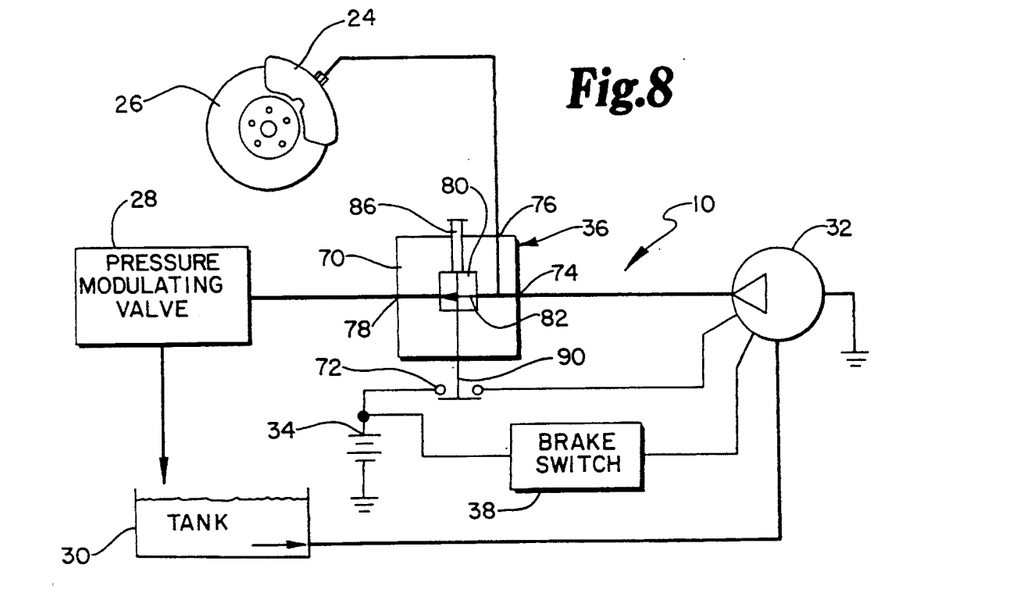
FIG. 8 is a combined hydraulic and electrical schematic illustration of the brake system of the present invention with the valve/switch assembly in the position it takes during an occupied seat condition.

The normal braking mode operation of brake system 10 can be described with reference to FIGS. 5 and 8. When the operator 22 (FIG. 1) is situated in a normal vehicle operating posture and an occupied seat condition is sensed, valve 70 is switched to first flow path schematically illustrated in FIG. 8. Seat condition switch 72 is also switched to its open state when an occupied seat condition is sensed. When the operator actuates brake pedal 18 during this occupied seat condition, brake switch 38 actuates pump 32 thereby causing pressurized hydraulic fluid to be provided to flow control valve 70. Primary piston 54 of pressure modulating valve 28 is also forced into housing 40 by mechanical pressure from brake pedal 18. The force on primary piston 54 applies a force to modulator spring 60 which in turn moves secondary piston 56 toward modulator piston 58. Once secondary piston 56 is moved a sufficient distance that its seal 55 closes replenishment port 52, a pressure lock is formed within the fail-safe chamber 62. Once the pressure lock is formed within fail-safe chamber 62, pressure on primary piston 54 is transmitted to modulator piston 58 to modulate the flow of hydraulic fluid through modulating fluid flow path 50. The return flow of pressurized hydraulic fluid from valve 70 to tank 30 is thereby restricted to regulate the amount of fluid applied to brake 24. The amount of braking force applied to wheels 26 by brake 24 is thereby effectively controlled by modulating the return flow of fluid from pump 32 to tank 30.

The operation of brake system 10 during the fail-safe mode can be described with reference to FIGS. 5, 6 and 8. Braking operation during the fail-safe mode is similar to that described for conventional braking with the operator actuating brake pedal 18 during an occupied seat condition. However, in the event of the failure or other inoperability of pump 32 or battery 34, the pump will not be supplying the flow of pressurized fluid that is modulated to actuate brake 24. With no pressurized fluid flow to input port 42 of pressure modulating valve 28, the actuation of brake pedal 18 will force modulator piston 58 into engagement with housing 40 in such a manner that the fail-safe fluid flow path 66 through the modulator piston is coupled to input port 42 by seal 71. The actuation of brake pedal 18 also causes hydraulic fluid from within fail-safe chamber 62 to overcome the force of check valve 68, and supply fluid through fail-safe fluid flow path 66, input port 42 and valve 70 to brake 24. Reverse flow check valve 88 (FIG. 3) in flow control valve 70 prevents the fluid from flowing to pump 32. This fail-safe braking mode operation is produced by one stroke of brake pedal 18. Fail-safe chamber 62 effectively operates as a master cylinder to provide a secondary source of pressurized fluid for braking operation.

Figure 9:
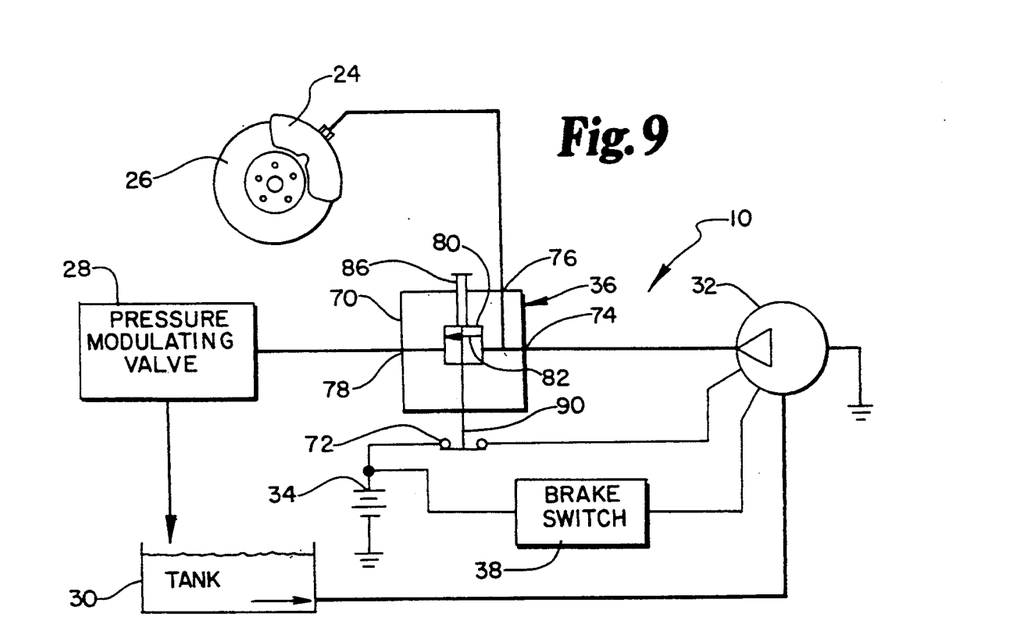
FIG. 9 is a combined hydraulic and electrical schematic illustration of the brake system of the present invention with the valve/switch assembly in the position it takes during an unoccupied seat condition.

The unoccupied seat condition mode of operation of brake system 10 can be described with reference to FIG. 9. If at any time an unoccupied seat condition is sensed, flow control valve 70 will be switched to the second flow path. At the same time, switch 72 closes the electric circuit to activate pump 32. Pressurized hydraulic fluid from pump 32 is thereby supplied directly and automatically to brake 24 to apply braking force to vehicle wheel 26.

Figure 10:
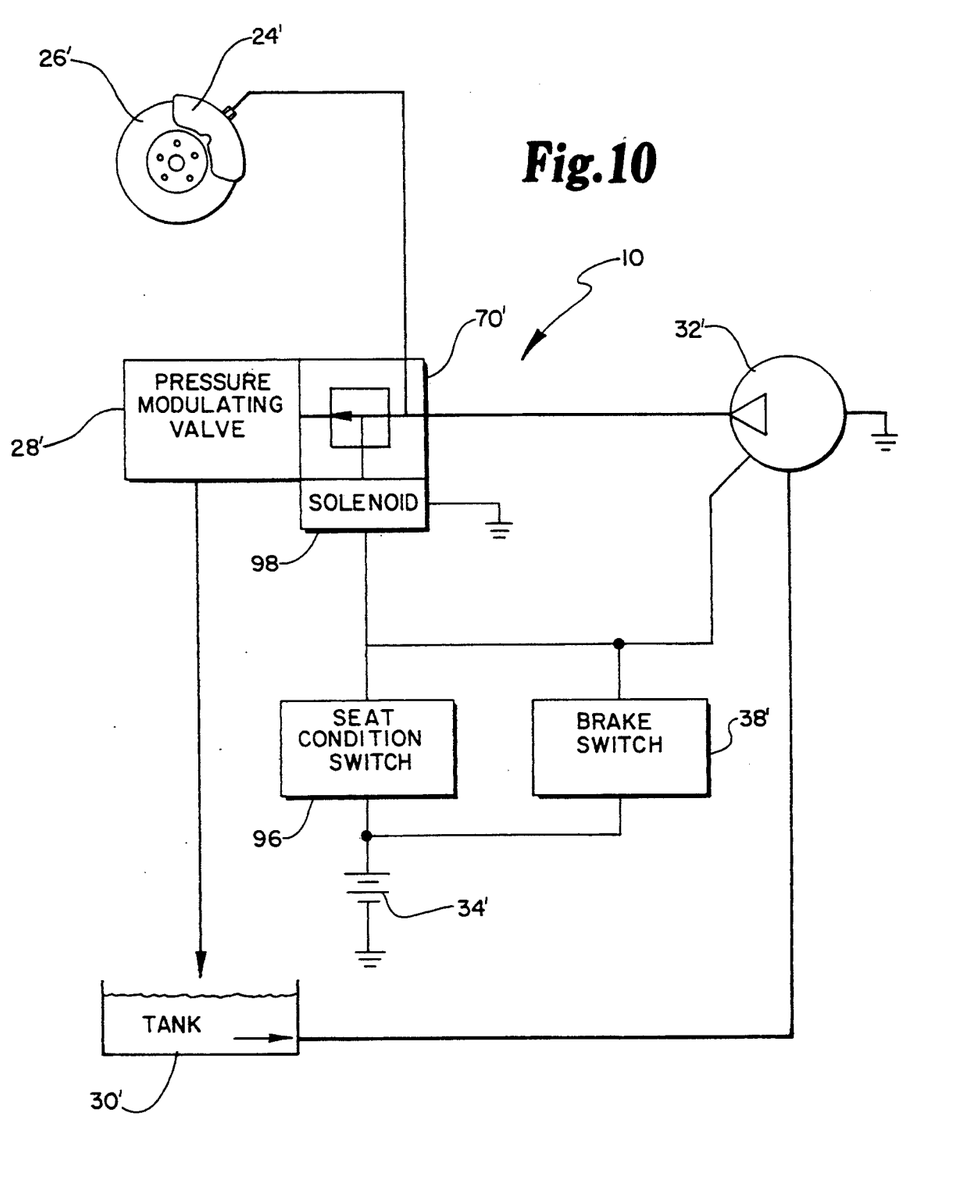
FIG. 10 is an alternative embodiment of the brake system of the present invention which includes the tandem pressure modulating valve and valve/switch assembly shown in FIG. 7.

Braking system 10', another embodiment of the present invention, is illustrated schematically in FIG. 10. Features braking system 10' that are identical to those of braking system 10 described above are indicated by common but primed (i.e., "X'") reference numerals. As shown in FIG. 10, brake system 10' includes hydraulic brake 24', vehicle wheel 26', pressure modulating valve 28', tank 30', DC (permanent magnet motor) hydraulic pump 32', battery 34', brake switch 38', and flow control valve 70'. Brake system 10' also includes a seat condition sensing switch 96 and solenoid 98.

Figures 6, 7:
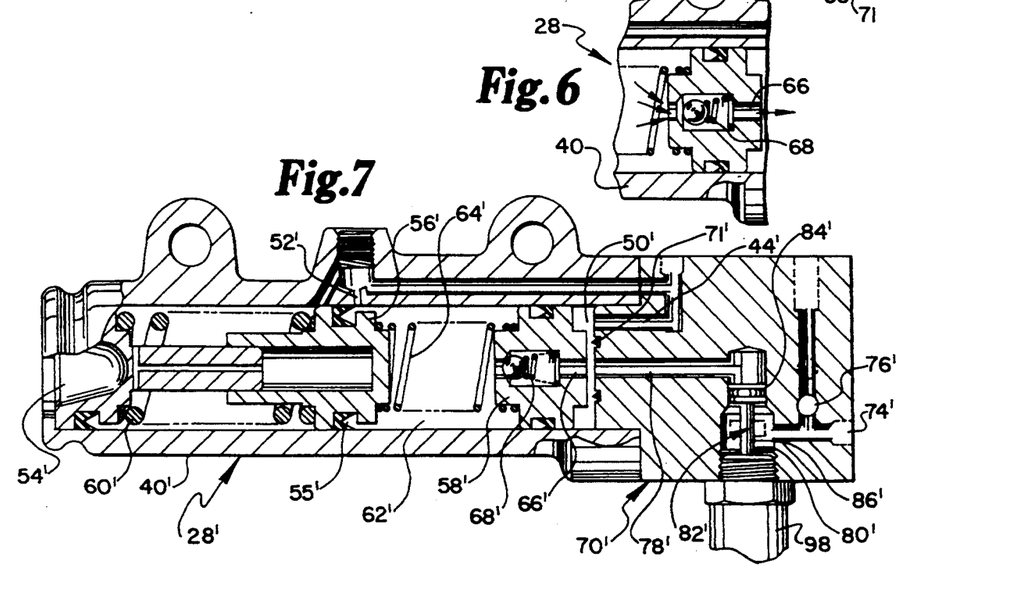
FIG. 6 is a fragmentary view of the pressure modulating valve shown in FIG. 5, illustrating the flow of fluid from the fail-safe chamber through the modulating piston when the valve is operating in the fail-safe mode.
FIG. 7 is a sectional view of an alternative embodiment in which the valve/switch assembly is mounted in tandem with the pressure modulating valve.

As shown in FIG. 7, pressure modulating valve 28' and flow control valve 70' are mounted together in a tandem configuration. Aside from the use of solenoid 98 to actuate plunger 82' and the elimination of the need for a hydraulic hose to connect second output port 78' of flow control valve 70' to the modulating fluid flow path 50' of pressure modulating valve 28', these components can be functionally and structurally identical to their counterparts in brake system 10. The fluid flow ports shown on flow control valve 70' in FIG. 7 that are not used for brake system 10' are sealed for this application.

Seat condition sensing switch 96 is positioned within the operator compartment 14 of vehicle 12 (FIG. 1) to provide information indicating whether or not the operator is in an appropriate position to operate the vehicle. In one embodiment switch 96 is biased to a normally closed electrical state and positioned below operator seat 16. During an occupied seat condition switch 96 is forced to an electrically open state disconnecting battery 34' from pump 32'. Solenoid 98 in this embodiment is biased in such a manner as to switch flow control valve 70' to the first flow path absent the application of electric power. Brake system 10' therefore operates in a manner similar to that of brake system 10 described above during normal braking operation. Brake system 10' also operates in a manner identical to that of brake system 10 in the fail-safe mode when an occupied seat condition is sensed. When an unoccupied seat condition is sensed, seat condition switch 96 is closed actuating solenoid 98 and pump 32. Seat condition switch 96 simultaneously actuates solenoid 98, switching flow control valve 70' to its second flow path so pressurized hydraulic fluid from pump 32' is applied directly to brake 24'. Braking force is therefore automatically applied to vehicle wheel 26' when an unoccupied seat condition is sensed.

The braking system of the present invention offers considerable advantages over the prior art. The pressure modulating valve functions both as a modulating valve during normal braking operation, and as a master cylinder providing a secondary source of pressurized fluid during the fail-safe mode. In the event an unoccupied seat condition is sensed, pressurized hydraulic fluid is automatically applied to the brake to stop the vehicle. The brake system and its components are efficient to manufacture and assemble. The brake system also offers a high degree of reliability.

Although the present invention has been described with reference to preferred embodiments, those skilled in the art will recognize that changes may be made in form and detail without departing from the spirit and scope of the invention.

What is claimed is:

1. A hydraulic brake system for a vehicle of the type including an operator seat, a brake pedal and a hydraulic brake responsive to operator actuation of the brake pedal, including:

a tank for hydraulic fluid;

an electric pump hydraulically connected between the tank and brake for providing pressurized hydraulic fluid to the brake; and a seat condition switch responsive to the presence of an operator in the operator seat, for actuating the pump when an unoccupied seat condition is sensed, and thereby causing pressurized hydraulic fluid to be applied to the brake.

2. The hydraulic brake system of claim 1 and further including:

a flow control valve including an input port hydraulically connected to the electric pump, a first output port hydraulically connected to the brake, a second output port, and a plunger responsive to the presence of operator in the operator seat for switching the valve between first and second flow paths, the first flow path hydraulically coupling the input port to both the first and second output ports when an occupied seat condition is sensed, and the second flow path hydraulically coupling the input port to the first output port and decoupling the second output port from the input port when an unoccupied seat condition is sensed; and a pressure modulating valve including an input port hydraulically connected to the second output port of the flow control valve, an output port hydraulically coupled to the tank, a modulating fluid flow path between the input and output ports, and a modulator piston responsive to operator actuation of the brake pedal for modulating the flow of pressurized fluid through the modulating fluid flow path and thereby restricting the flow of pressurized hydraulic fluid to the tank and causing the brake to be actuated when the flow control valve is switched to the first flow path.

3. The hydraulic brake system of claim 2 and further including a brake switch coupled to the pump, for actuating the pump in response to operator actuation of the brake pedal.

4. The hydraulic brake system of claim 3 and further including a mechanical linkage coupling the plunger of the flow control valve to the operator seat.

5. The hydraulic brake system of claim 4 wherein the flow control valve includes a biasing mechanism for biasing the plunger so the valve is switched to the second flow path when the unoccupied seat condition is sensed.

6. The hydraulic brake system of claim 3 and further including a mechanical linkage coupling the seat condition switch to the flow control valve plunger.

7. The hydraulic brake system of claim 6 wherein the seat condition switch is mounted to the flow control valve.

8. The hydraulic brake system of claim 3 and further including a solenoid coupled to the seat condition switch for actuating the plunger and switching the flow control valve to its second flow path when the unoccupied seat condition is sensed.

9. The hydraulic brake system of claim 8 wherein the flow control valve is mounted to the pressure modulating valve.

10. The hydraulic brake system of claim 3 wherein:
the system further includes a reverse flow check valve for preventing the flow of hydraulic fluid from the flow control valve to the pump; and
the modulating valve further includes:
    a primary piston responsive to operator actuation of the brake pedal;
    a fail-safe fluid chamber between the primary piston and the modulator piston; and
    a fail-safe fluid flow path and reverse flow check valve in the modulator piston between the fail-safe fluid chamber and the modulating fluid flow path, the pressure modulating valve operating in a modulating mode with the fail-safe chamber acting as a pressure lock and enabling the modulator piston to restrict the flow of pressurized fluid to the tank and actuate the brake in response to operator actuation of the brake pedal when the pump is operating, and the modulating valve operating in a fail-safe mode with the primary piston forcing fluid from the fail-safe chamber through the reverse flow check valve in the modulator piston and out of the modulating valve input port to actuate the brake in response to operator actuation of the brake pedal when the pump is not operating.

11. The hydraulic brake system of claim 10 wherein the modulating valve further includes a replenishing port coupling the modulating fluid flow path to the fail-safe fluid chamber, the replenishing port being closed by the primary piston to provide the pressure lock in response to operator actuation of the brake pedal.

12. The hydraulic brake system of claim 10 wherein the pressure modulating valve further includes a seal for coupling the fail-safe fluid flow path to the pressure modulating valve input port when the pressure modulating valve is operating in the fail-safe mode.

13. A hydraulic brake system for a vehicle of the type including an operator seat, a brake pedal and a hydraulic brake responsive to operator actuation of the brake pedal, including
a tank for hydraulic fluid;
an electric pump hydraulically connected between the tank and brake for providing pressurized hydraulic fluid; and
a pressure modulating valve having a modulating fluid flow path hydraulically connected between the electric pump and the tank, and a modulator piston responsive operator actuation of the brake pedal for modulating the flow of pressurized fluid through the modulating fluid flow path and thereby restricting the flow of pressurized hydraulic fluid to the tank and causing the brake to be actuated.

14. The hydraulic brake system of claim 13 and further including a brake switch coupled to the electric pump, for actuating the pump in response to operator actuation of the brake pedal.

15. The hydraulic brake system of claim 13 wherein:
the system further includes a reverse flow check valve between the electric pump and brake; and
the pressure modulating valve further includes:
    a primary piston responsive to operator actuation of the brake pedal;
    a fail-safe fluid chamber between the primary piston and the modulator piston; and
    a fail-safe fluid flow path and reverse flow check valve in the modulator piston between the fail-safe fluid chamber and the modulating fluid flow path, the pressure modulating valve operating in a modulating mode with the fail-safe chamber acting pressure lock and enabling the modulator piston restrict the flow of pressurized fluid to the flank and actuate the brake in response to operator actuation of the brake pedal when the pump is operating, and the modulating valve operating in a fail-safe mode with the primary piston forcing fluid from the fail-safe chamber through the reverse flow check valve in the modulator piston and out of the modulating valve to the brake, actuate the brake in response to operator actuation of the brake pedal when the pump is not operating.

16. The hydraulic brake system of claim 15 and further including a fluid flow member coupling the brake, pressure modulating valve and pump, the fluid flow member including an input port hydraulically connected to the pump, a first output port hydraulically connected to the brake, and a second output hydraulically connected to an input port of the pressure modulating valve.

17. The hydraulic brake system of claim 16 wherein:
the system further includes a seat condition switch responsive to the presence of an operator in the operator seal and coupled to the pump, for actuating the pump when an unoccupied seat condition is sensed; and
the fluid flow member further includes a plunger responsive the presence of an operator in the operator seat for switching the member between first and second flow paths, the first flow path hydraulically coupling the input to both the first and second output ports when an occupied seat condition is sensed, and the second path hydraulically coupling the input port to the first output port and decoupling the second output port from the input port when an unoccupied seat condition is sensed, 18. The hydraulic brake system of claim 17 and further including a mechanical linkage coupling the plunger of the fluid flow member to the operator seat, 19. The hydraulic brake system of claim 18 wherein the fluid flow member includes a biasing mechanism for biasing the plunger so the member is switched to the second flow path when the unoccupied seat condition is sensed.

20. The hydraulic brake system of claim 17 and further including a mechanical linkage coupling the seat condition switch to the fluid flow member plunger.

21. The hydraulic brake system of claim 20 wherein the seat condition switch is mounted to the fluid flow member.

22. The hydraulic brake system of claim 17 and further including a solenoid coupled to the seat condition switch for actuating the plunger and switching the fluid flow member to its second flow path when the unoccupied seat condition is sensed.

23. The hydraulic brake system of claim 22 wherein the fluid flow member is mounted to the pressure modulating valve.

24. The hydraulic brake system of claim 13 wherein the modulating valve further includes a replenishing port coupling the modulating fluid flow path to the fail-safe fluid chamber, the replenishing port being closed by the primary piston to provide the pressure lock in response to operator actuation of the brake pedal.

25. The hydraulic brake system of claim 13 wherein the pressure modulating valve further includes a seal for coupling the fail-safe fluid flow path to an input port of the pressure modulating valve when the pressure modulating valve is operating in the fail-safe mode.

26. A hydraulic brake system for a vehicle of the type including an operator seat, a brake pedal and a hydraulic brake responsive to operator actuation of the brake pedal, including:
a tank for hydraulic fluid;
an electric pump hydraulically connected to the tank for providing pressurized hydraulic fluid;
a flow control valve including an input port hydraulically connected to the electric pump, a first output pore hydraulically connected to the brake, a second output port, and a plunger responsive to the presence of an operator in the operator seat for switching the valve between first and second flow paths, the first flow path hydraulically coupling the input port to both the first and second output ports when an occupied seat condition is sensed, and the second flow path hydraulically coupling the input port to the first output port and decoupling the second output port from the input port when an unoccupied seat condition is sensed;
a seat condition switch responsive to the presence of an operator in the operator seat, for actuating the pump and causing pressurized hydraulic fluid to be applied to the brake when an unoccupied seat condition is sensed;
a reverse flow check valve between the pump and the second output port of the flow control valve;
a brake switch for actuating the pump in response to operator actuation of the brake pedal; and
a pressure modulating valve including:
an input port hydraulically connected to the second output port of the flow control valve;
an output port hydraulically coupled to the tank;
a modulating fluid flow path between the input and output ports;
a primary piston responsive to operator actuation of the brake pedal;
a modulator piston for modulating the flow of pressurized fluid through the modulating fluid flow path;
a fail-safe fluid chamber between the primary piston and the modulator piston; and
a fail-safe fluid flow path and reverse flow check valve in the modulator piston between the fail-safe fluid chamber and the modulating fluid flow path, the pressure modulating valve operating in a modulating mode with the fail-safe chamber acting as a pressure lock and enabling the modulator piston to restrict the flow of pressurized fluid to the tank and actuate the brake in response to operator actuation of the brake pedal when the pump is operating, and the modulating valve operating in a fail-safe mode with the primary piston forcing fluid from the fail-safe chamber through the reverse flow check valve in the modulator piston and out of the input port of the modulating valve to the brake, to actuate the brake in response to operator actuation of the brake pedal when the pump is not operating.

27. The hydraulic brake system of claim 26 and further including a mechanical linkage coupling the plunger of the flow control valve to the operator seat.

28. The hydraulic brake system of claim 27 wherein the flow control valve includes a biasing mechanism for biasing the plunger so the valve is switched to the second flow path when the unoccupied seat condition is sensed.

29. The hydraulic brake system of claim 27 and further including a mechanical linkage coupling the seat condition switch to the flow control valve plunger.

30. The hydraulic brake system of claim 29 wherein the seat condition switch is mounted to the flow control valve.

31. The hydraulic brake system of claim 26 and further including a solenoid coupled to the seat condition switch for actuating the plunger and switching the flow control valve to its second flow path when the unoccupied seat condition is sensed.

32. The hydraulic brake system of claim 31 wherein the flow control valve is mounted to the pressure modulating valve.

33. The hydraulic brake system of claim 26 wherein the modulating valve further includes a replenishing port coupling the modulating fluid flow path to the fail-safe fluid chamber, the replenishing port being closed by the primary piston to provide the pressure lock in response to operator actuation of the brake pedal.

34. The hydraulic brake system of claim 26 wherein the pressure modulating valve further includes a seal for coupling the fail-safe fluid flow path to the pressure modulating valve input port when the pressure modulating valve is operating in the fail-safe mode.

* * * * *

UNITED STATES PATENT AND TRADEMARK OFFICE
CERTIFICATE OF CORRECTION

PATENT NO. : 5,368,372

DATED : November 29, 1994

INVENTOR(S) : Cords et al.

It is certified that error appears in the above-identified patent and that said Letters Patent is hereby corrected as shown below:

```
Column 6, line 46, after "of" insert --an--
Column 7, line 67, after "including" insert --:--
Column 8, line 7, after "sponsive" insert --to--
Column 8, line 28, after "acting" insert --as a--
Column 8, line 29, after "piston" insert --to--
Column 8, line 30, delete "flank" and insert --tank--
Column 8, line 37, after "brake," insert --to--
Column 8, line 45, after "output" insert --port--
Column 8, line 51, delete "seal" and insert --seat--
Column 8, line 55, after "sponsive" insert --to--
Column 8, line 58, after "input" insert --port--
Column 8, line 60, after "second" insert --flow--
Column 8, line 63, delete "," and insert --.--
Column 8, line 66, delete "," and insert --.--
```

UNITED STATES PATENT AND TRADEMARK OFFICE
CERTIFICATE OF CORRECTION

PATENT NO. : 5,368,372
DATED : November 29, 1994
INVENTOR(S) : Cords et al

It is certified that error appears in the above-indentified patent and that said Letters Patent is hereby corrected as shown below:

Column 9, line 39, delete "pore" and insert --port--.

Signed and Sealed this

Fourteenth Day of February, 1995

Attest:

BRUCE LEHMAN

Attesting Officer     Commissioner of Patents and Trademarks